INVENTORS
RALPH COVER &
CLYDE KEMPER

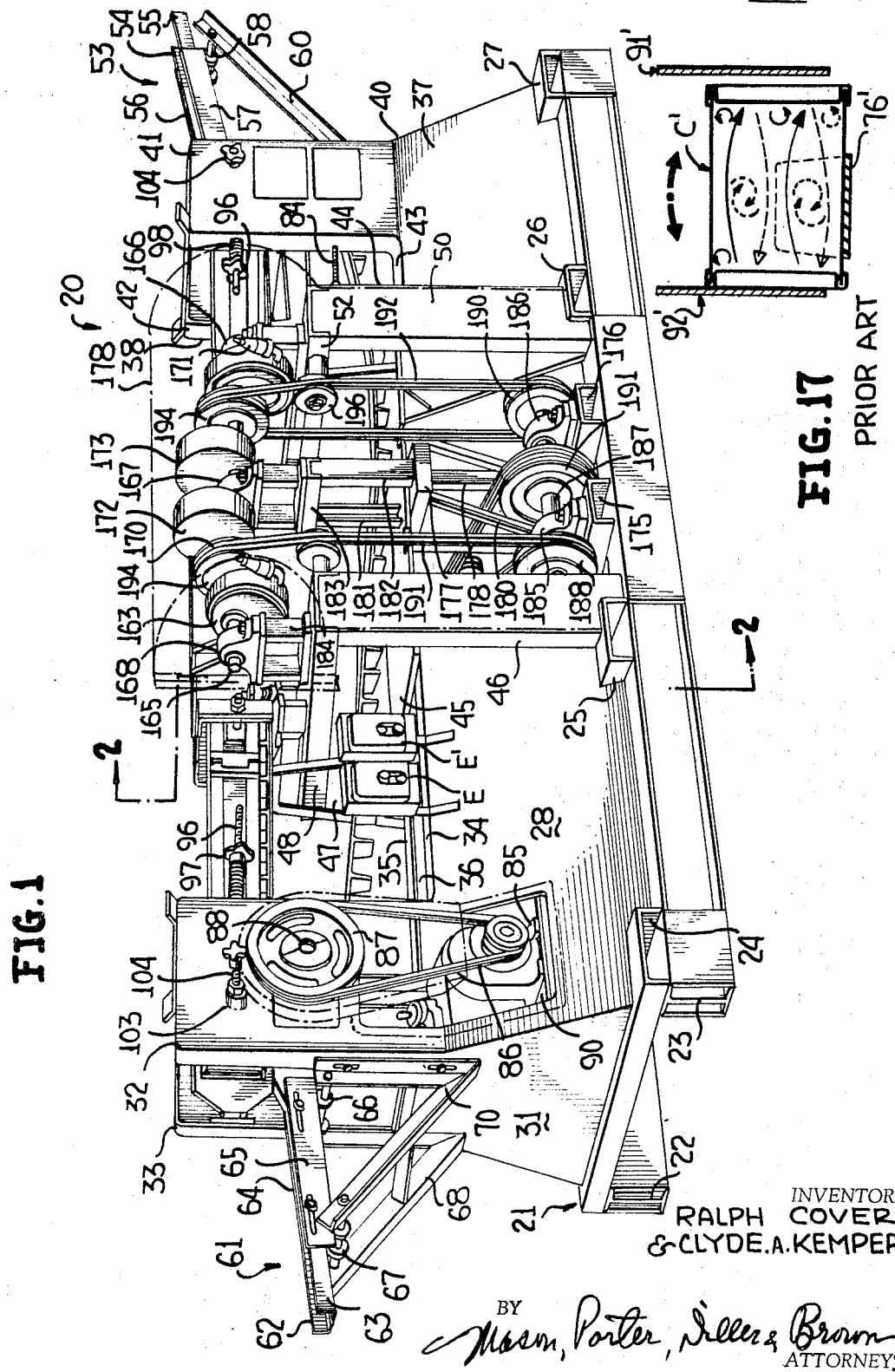

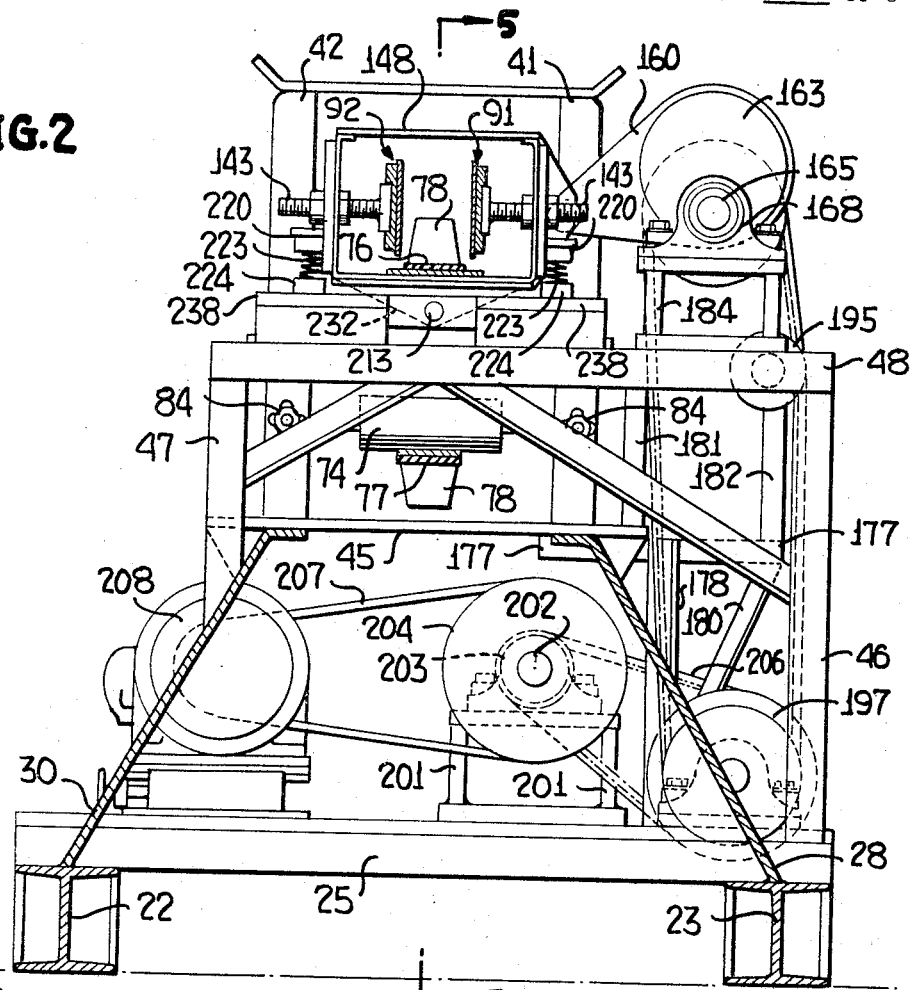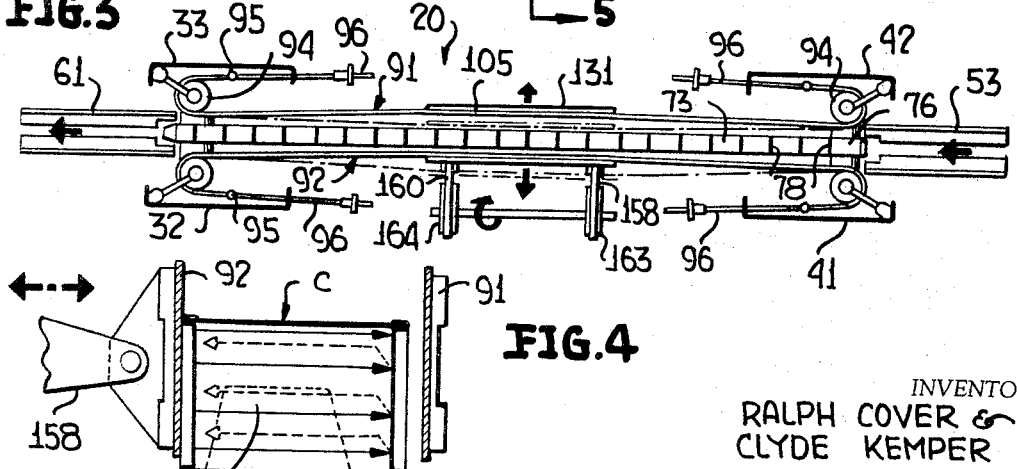

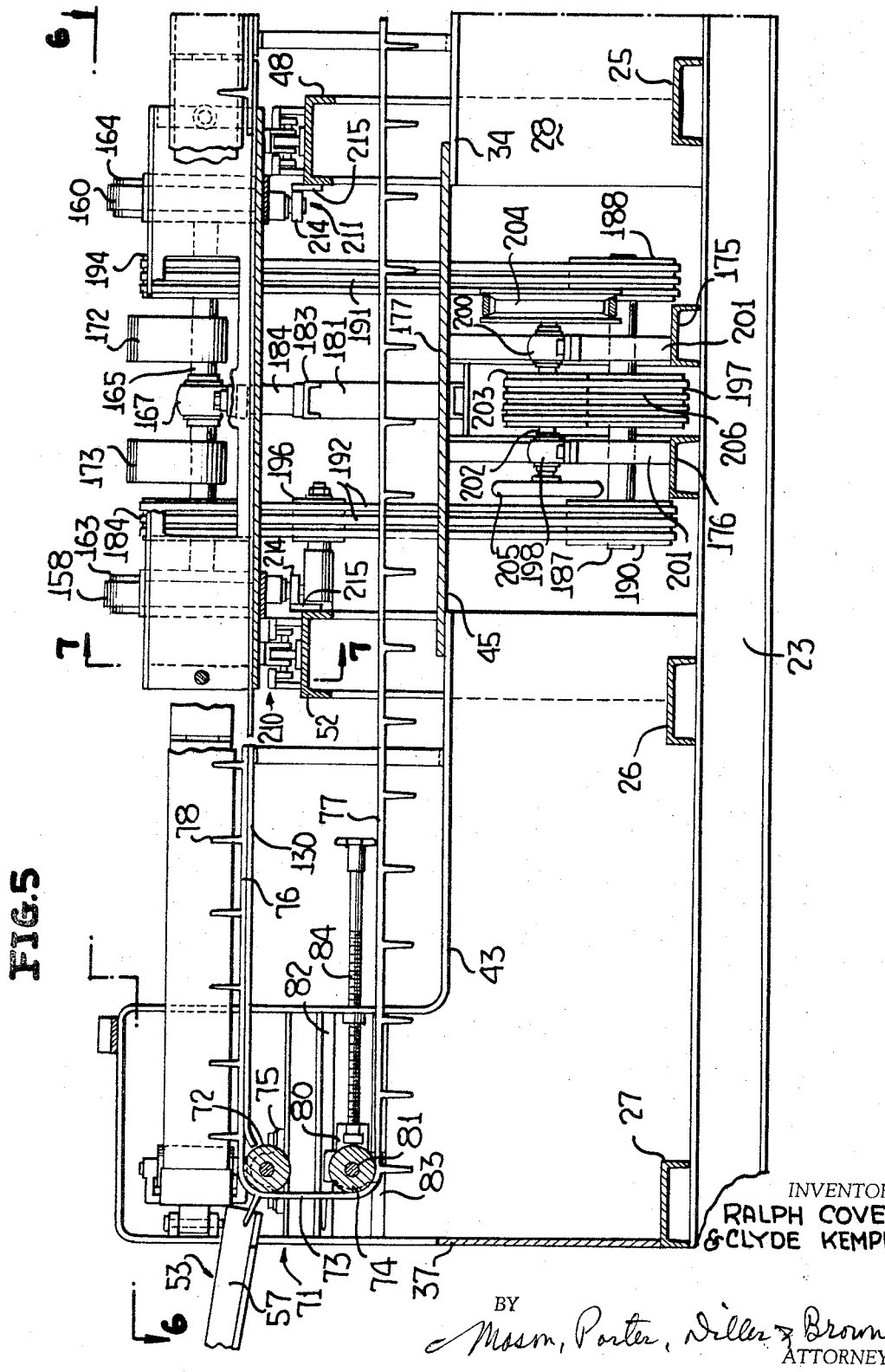

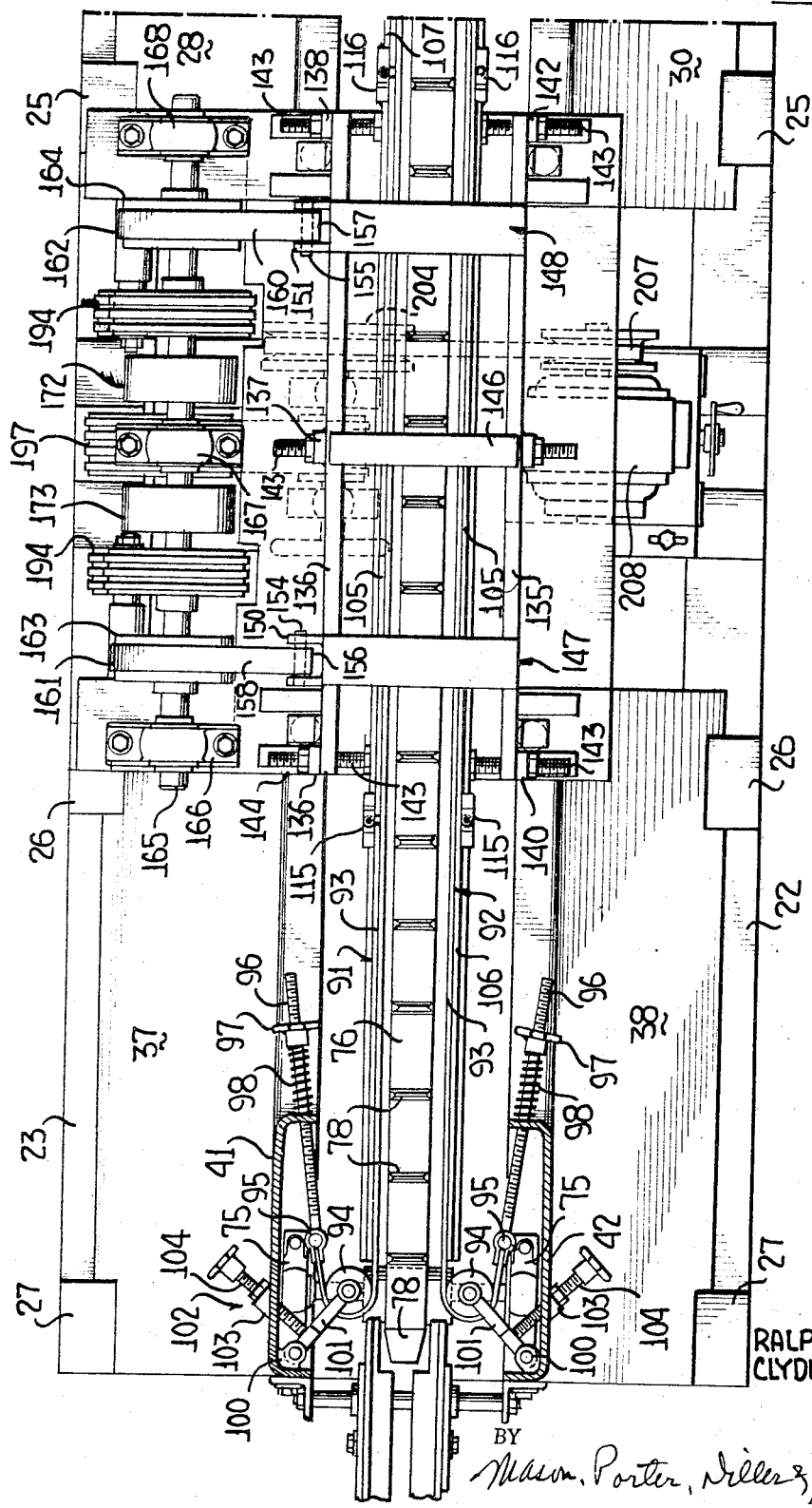

BY Mason, Porter, Diller & Brown
ATTORNEYS

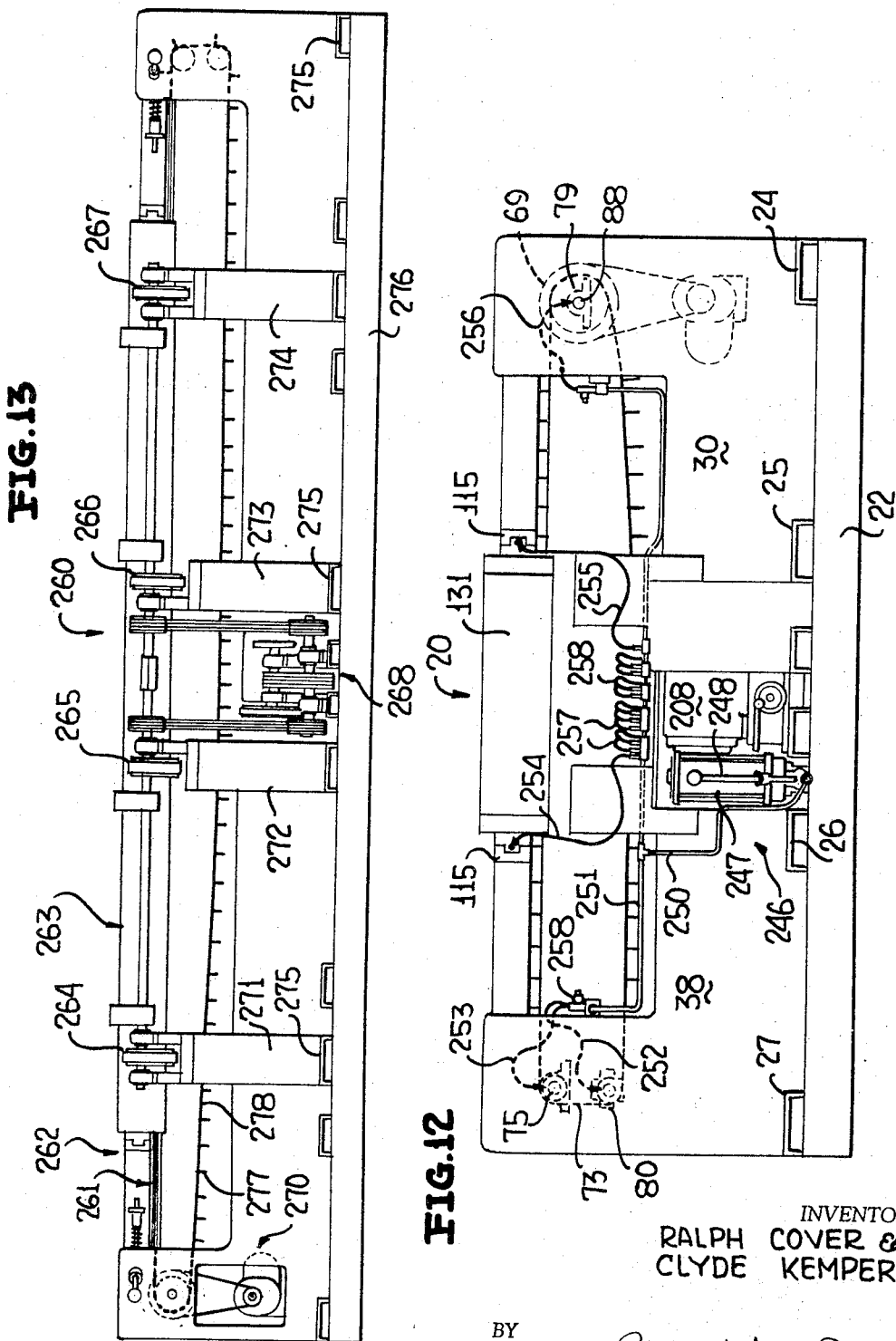

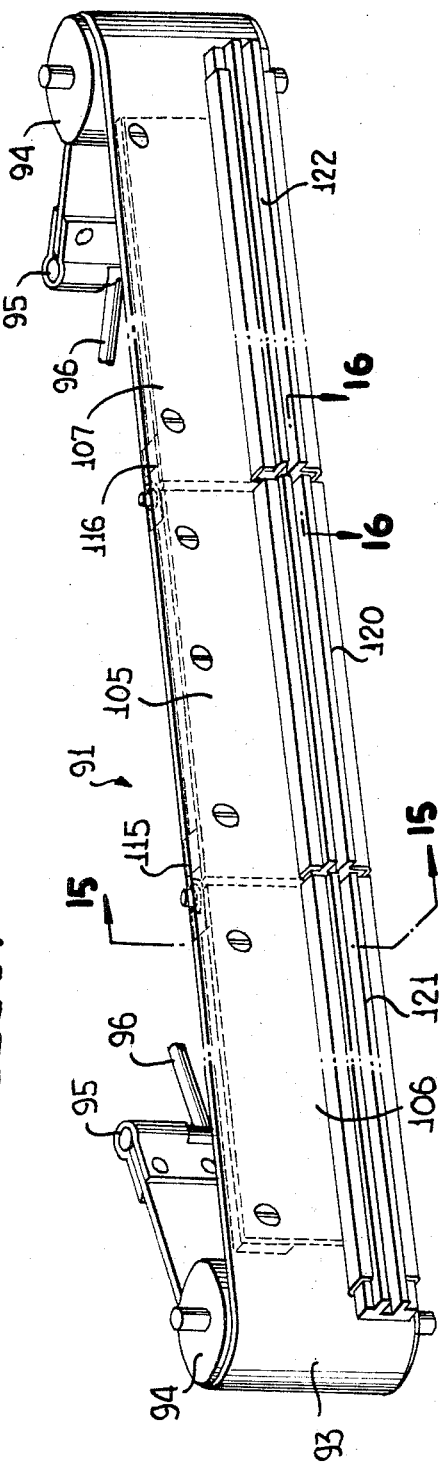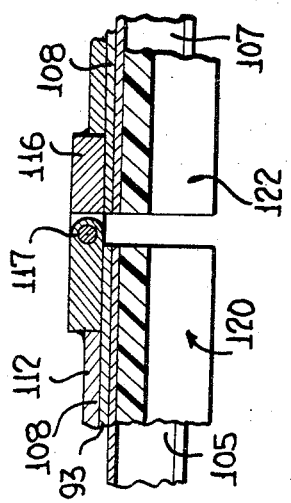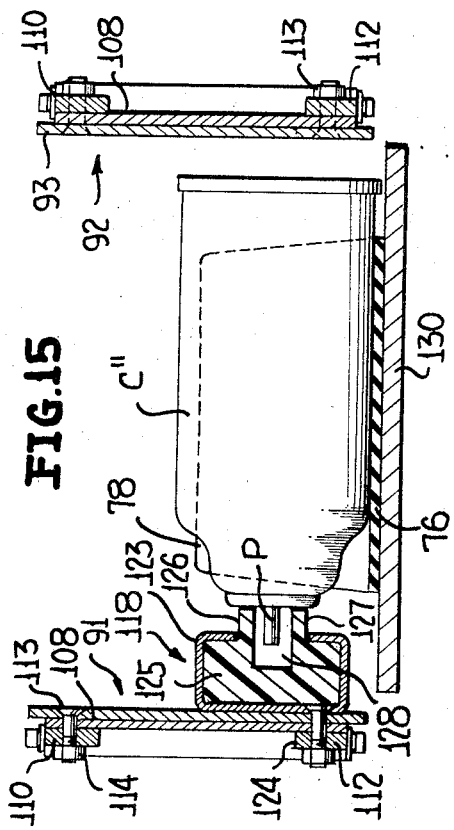

United States Patent Office 3,427,004
Patented Feb. 11, 1969

3,427,004
CAN SHAKING DEVICE
Ralph Cover and Clyde A. Kemper, Westminster, Md., assignors to The United Company, Westminster, Md., a corporation of Maryland
Filed July 24, 1967, Ser. No. 655,578
U.S. Cl. 259—59                                   20 Claims
Int. Cl. B01f *11/00, 13/00*

ABSTRACT OF THE DISCLOSURE

An apparatus is provided for conveying cans and like containers along a generally horizontal path and for shaking the containers in a back-and-forth motion, transverse to the direction of movement along the predetermined path, in order that a product fill in the containers may be evenly distributed throughout, or a gaseous substance raised to the desired pressure within the container. A particular desired motion is provided through a novel combination of machine elements which includes an eccentric for oscillating a frame, and guiding means for the oscillating frame.

---

This invention relates to a container shaking machine, and in particular to a machine for conveying containers along a predetermined path and shaking those containers in a back-and-forth linear motion, transverse to the direction of movement of containers along the path, concurrently with the movement of the containers along the path.

In the packaging industry, it has long been recognized that it is desirable to pre-shake many products prior to their use by the ultimate consumer. In the past, it was necessary to pass on a shaking function to the consumer, generally with the instructions "shake well before using," in order to insure a proper consistency and blend of the packaged material, so common in the packaging of numerous products, including food, drink, pressure dispensed items such as shaving cream, and the like. Other products, such as paint, generally required a stirring operation by the consumer.

In the more recent past, it has become commonplace to effect the necessary shaking of packaged products in the plant, following the packaging operation, rather than passing the necessary shaking operation on to the consumer.

By providing a container shaking apparatus for packaging plant use, it has been found that the correct required shaking time for any given product could be more closely controlled, and remain consistent among all packages of a given product. Thus by pre-determining the proper "shake" for any given container, greater mixing control could be realized, and in the case of numerous pressure-dispensed products such as hair spray and shaving cream, the optimum dispensing pressure could be provided for each container, thereby eliminating the inconsistencies of human error which may be present if the shaking operation is passed on to the consumer and necessarily varies, depending upon the consumer.

Shakers have thus been developed which are adapted to comprise a portion of a production line, or packaging line, for pre-shaking filled containers during movement of the containers along a predetermined path. Such devices have been quite successful in providing a desirable container shake for many products, by providing oscillating members which pivotally oscillate about a fixed point, and which therefor necessarily have opposite ends which oscillates in an arcuate path. Other members are connected to those end portions which oscillate in the arcuate path, and engage container ends, thereby also oscillating the containers and their fill in a generally arcuate path. In some products, it is not desirable to oscillate the fill within the container in an arcuate path, in that frequently undesirable currents can be set up in the fill, particularly if the fill is a liquid or a gaseous material, these undesirable currents resulting in small eddy currents in the fill near corners of the container, thereby possibly precluding the fill from achieving the most desirable uniform and homogenous mixture.

The present invention seeks to provide a substantial improvement over existing can and other container shaking devices by providing a shaking device which is capable of shaking containers which are conveyed along a pre-determined path in such a way that the containers are moved back-and-forth in a linear movement, transverse to the direction of movement of serially disposed containers moving along a predetermined path.

Accordingly, it is a primary object of this invention to provide a shaking machine for handling articles conveyed along a predetermined path, wherein means are provided for shaking articles in a back-and-forth straight line motion simultaneously with the conveying of articles along their pre-determined path.

It is another object of this invention to provide a container shaking machine for use in mixing products disposed within the containers, wherein the machine is adapted to convey containers along a generally horizontal path simultaneously with providing a transverse oscillatory straight-line motion of the containers.

It is a further object of this invention to provide a container shaking machine which is adapted to mix products contained within the containers by shaking the products while they are being conveyed along a predetermined path, and wherein an endless conveying member is provided for conveying containers along their predetermined path, the conveying member being of integral one-piece construction, and having upstanding spacer members on an upper run thereof, defining container-receiving pockets therebetween.

It is a further object of this invention to provide a novel shaking machine for cans and other containers which is adapted to convey the containers along a pre-determined path and wherein guide members are provided on each side of the path for engaging container end portions and thereby shaking the containers in an oscillatory straight-line motion.

It is another object of this invention to accomplish the above object wherein the guide members are provided with a straight-line driving motion and are constrained for straight-line oscillatory motion.

It is a further object of this invention to provide a shaking machne for cans and like containers, wherein guide members are provided for engaging container end portions, and wherein the guide members are eccentrically driven but are constrained for back-and-forth linear movement only, by means of a plurality of rollers and associated linear tracks.

It is yet another object of this invention to accomplish the above object wherein safety means are provided for permitting limited movement of portions of the roller and track elements mentioned above, in a direction transverse to the normal direction of movement or a roller along its track.

It is a further object of this invention to provide a container shaking device which is adapted to shake articles being conveyed along a predetermined path in a direction transverse to that path, in an oscillatory straight-line motion, wherein guide members are provided for engaging containers conveyed along the path and imparting the linear motion thereto, and wherein the guide members are adjustably positionable to accommodate containers of various sizes.

It is a further object of this invention to provide a container shaking device, for shaking containers conveyed along a predetermined path in a linear back-and-forth shaking movement transversely of the path, and wherein guide members are provided on opposite sides of the path, the guide members being at least partly movable transversely of the path, to impart the linear movement to the containers conveyed therealong, and wherein at least one of the guide members includes a spacer mounted thereon having a means for receiving therein and protecting projecting portions of containers conveyed along the path.

It is another object of this invtntion to provide a container shaking device wherein means are provided for conveying containers along a predetermined path, and means are provided for delivering a transverse linear back-and-forth motion to containers thus conveyed, the latter means including guide members disposed on opposite sides of the path, and at least one shaft-mounted eccentric connected to at least one of the guide members, at substantially the same vertical level thereof, for directly imparting an oscillatory motion to the guide member.

With the above and other objects in view that will hereinafter appear, the nature of the invention will be more clearly understood by reference to the following detailed description, the appended claims and the several views illustrated in the accompanying drawings:

In the drawings:

FIGURE 1 is a front perspective view of a container shaking machine of this invention, in its fully assembled condition, but wherein an eccentric guard is illustrated in phantom, for purposes of clarity, in order that the mountings for the eccentrics and their counter-weights may be clearly illustrated.

FIGURE 2 is an enlarged transverse sectional view of the machine of FIGURE 1, taken generally along the lines 2—2 of FIGURE 1, and wherein the disposition of the container conveying belt and guide members, along with the frame which carries the guide members, is clearly illustrated.

FIGURE 3 is a schematic diagram of those components of the machine of this invention which have direct contact with containers conveyed therealong, and wherein the guide members are illustrated in plan view on opposite sides of the container conveying belt, and wherein the guide members are further illustrated in phantom, thereby indicating the transverse shaking stroke of the machine of this invention.

FIGURE 4 is an enlarged fragmentary diagrammatic view of a container of the can type, disposed on an upper run of a conveyor belt, between two upstanding conveyor belt projections, and wherein guide members are illustrated at opposite ends of the can for oscillating the can in a back-and-forth motion, and providing a similar motion to a product contained within the can.

FIGURE 5 is a longitudinal sectional view of a portion of the machine of this invention, taken generally along the line 5—5 of FIGURE 2, and wherein the means for driving the eccentric drive of this invention is best illustrated.

FIGURE 6 is a top plan view of the machine of this invention, taken generally along the line 6—6 of FIGURE 5, and wherein the adjustment means and resilient flexing means for the guide members is best illustrated.

Figure 7:
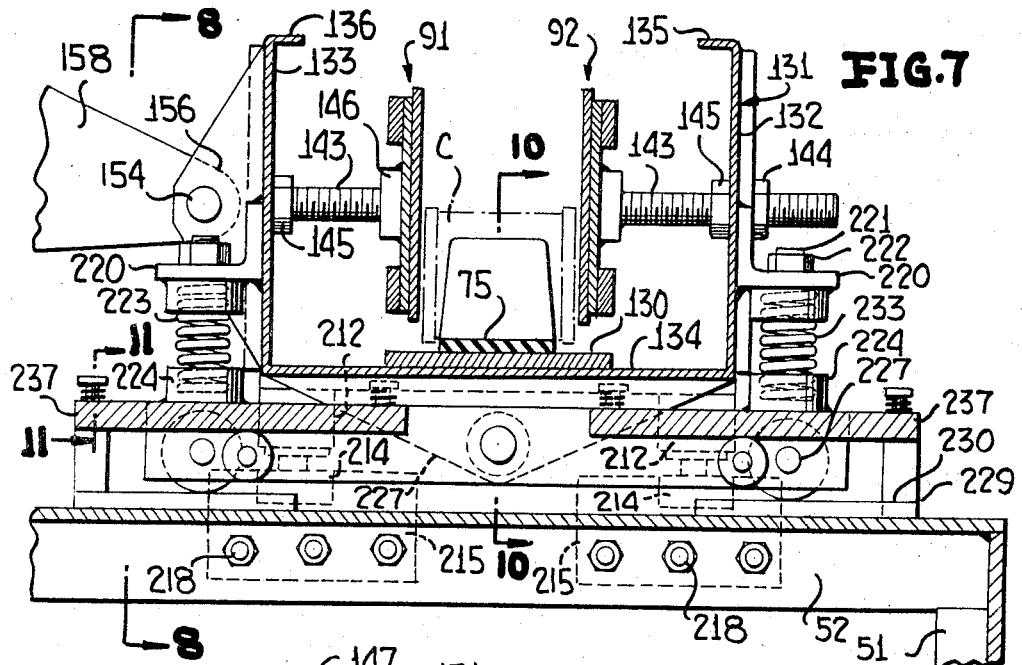

FIGURE 7 is an enlarged fragmentary transverse sectional view taken generally along the line 7—7 of FIGURE 5, and wherein the adjustment means for a movable portion of the guide members is illustrated, and wherein the roller and track guide means for the frame to which the guide member central portions are attached is also illustrated.

Figure 8:
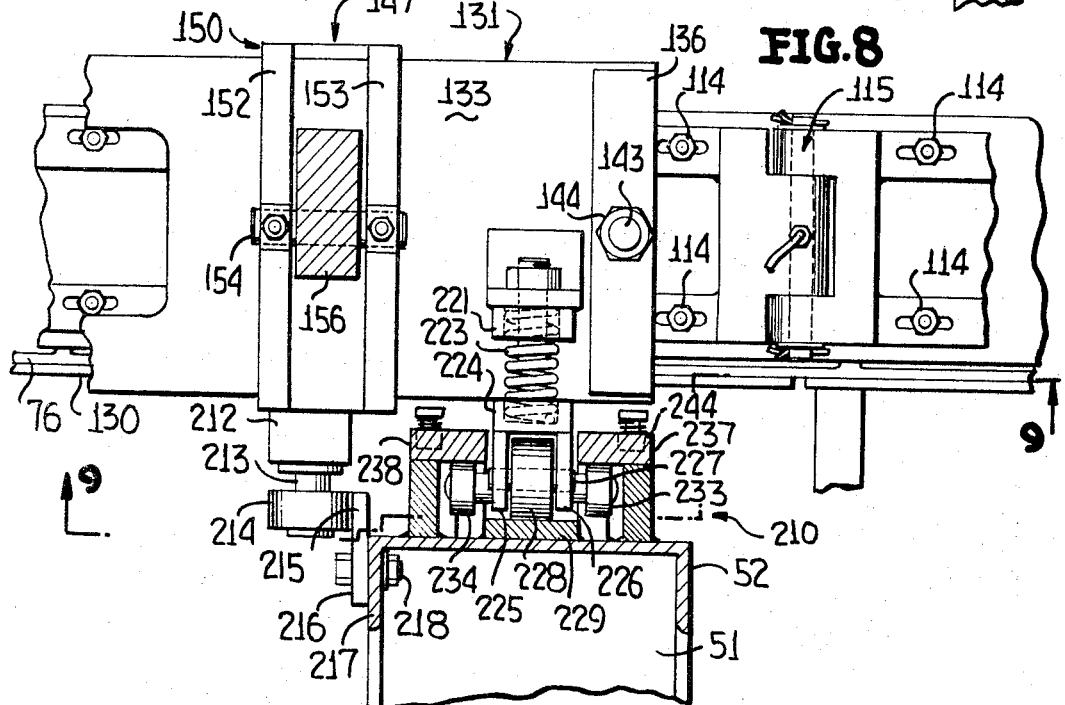

FIGURE 8 is an enlarged longitudinal sectional view, taken generally along the line 8—8 of FIGURE 7, and wherein the roller and track guide means for the frame member which carries the guide members is clearly illustrated.

Figures 9, 10, 11:
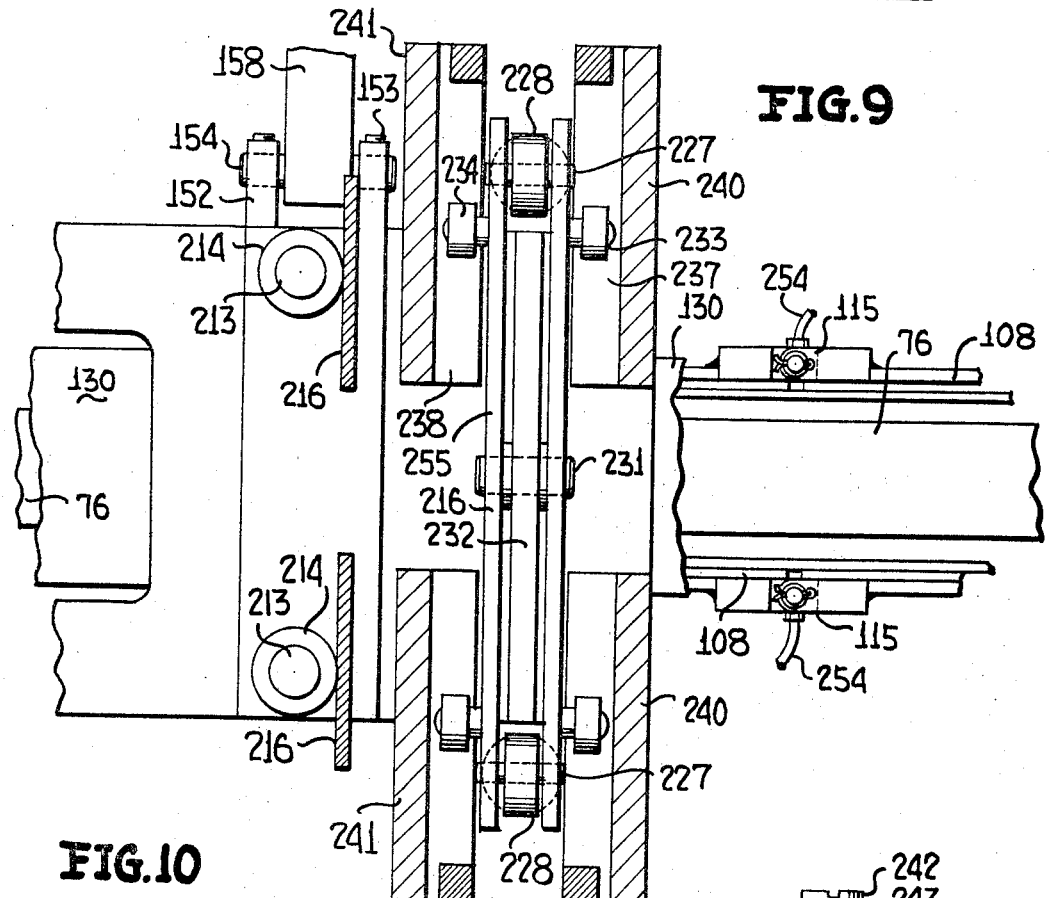

FIGURE 9 is a fragmentary bottom view of the machine portion illustrated in FIGURE 8, taken generally along the line 9—9 of FIGURE 8, and wherein the details of construction of the roller and track guide means are further illustrated.

FIGURE 10 is an enlarged fragmentary sectional view of a portion of the machine of this invention, taken generally along the line 10—10 of FIGURE 7, and wherein the integral nature of the conveyor belt with its upstanding pocket-forming portions is illustrated, along with a further illustration of the roller and track guide means.

FIGURE 11 is an enlarged fragmentary sectional view of a track mount of this invention, taken along the line 11—11 of FIGURE 7, and wherein a safety feature of this invention is illustrated, whereby a roller track is resiliently biased in a given position, but is movable when sufficient force is present to overcome the force of a biasing spring.

FIGURE 12 is a side elevational view of the machine of this invention, with the lubrication system for the various bearings of this invention being schematically illustrated.

FIGURE 13 is a side elevational view of a modified form of the shaking machine of this invention, wherein a substantially longer shaking time may be realized by utilizing an extended conveyor with correspondingly extended transversely movable guide members, with additional driving eccentrics therefor.

FIGURE 14 is an enlarged perspective view of one of the guide members of this invention, comprising a belt having a container end guard mounted thereon.

FIGURE 15 is an enlarged transverse sectional view taken generally along the line 15—15 of FIGURE 14, and wherein a container of the aerosol type is illustrated between guide members, with a protruding dispensing portion of the aerosol container extending into a longitudinal slot of the container end guard.

FIGURE 16 is an enlarged fragmentary sectional view of a portion of the hinge structure of the container guide member illustrated in FIGURE 14, taken along the line 16—16 thereof.

FIGURE 17 is an enlarged schematic view of a container of the can type, disposed on an endless conveying member, between guide members, the guide members being adapted for oscillatory arcuate movement in the manner of prior art devices, and wherein possible paths of fluid movement within the container are illustrated.

Referring now to the drawings in detail, reference is first made to FIGURE 1, wherein there is illustrated the shaking machine 20 of this invention.

The machine 20 includes a base 21 comprising longitudinally disposed I-beams 22 and 23, with connecting channel members 24, 25, 26 and 27 welded to upper portions of the beams 22 and 23, the channel members being disposed at spaced intervals along the beams 22 and 23.

Upwardly directed inwardly sloping support members 28 and 30 are provided, welded to the beams 22 and 23 and to the channels 24 and 25, at the downstream end of the machine, or the left end as viewed in FIGURE 1. The members 28 and 30 are connected by a generally trapezoidal shaped end member 31. The left-most end of the planar supporting member 28, as viewed in FIGURE 1 is provided with a generally vertically upstanding portion 32. Similarly, an upstanding support portion 33 is provided by the planar member 30. The two support portions 32 and 33 provide a housing for a container guide adjusting means (later to be described), at the container exit end of the machine. Other upper portions of the planar members 28 and 30 are inwardly bent at 34 and 35, but provide a void 36 therebetween, for access into the machine between the members 28 and 30.

Similarly, planar supporting members 37 and 38 are provided at the container inlet end of the machine, having an inter-connecting end member 40 and upstanding portios 41 and 42, respectively, the upstanding portions 41 and 42 cooperating to define a housing for a guide member adjusting means disposed therebetween. Upper portions of the sloped supporting members 37 and 38 are also inturned at 43 and 44, similar to the portions 34 and 35 of the members 28 and 30, and a cover plate 45 is attached thereto, for supporting longitudinally innermost ends of the members 28, 30, 37 and 38.

A pair of upstanding channel-type supporting members 46 and 47 are provided, welded to the transverse channel 25 and to the sloped supporting member 30, respectively, the channels 46 and 47 being connected at their upper ends by a transverse channel-type supporting member 48. Similarly, upstanding channels 50 and 51 are provided, having a transversely disposed inter-connecting channel-type supporting member 52 at their upper ends.

A container inlet fixture 53 is provided, and comprises a pair of angles 54 and 55, adjustably and clampingly received within respective supports 56 and 57, to provide a downwardly sloping ramp for containers being directed into the machine 20. The supporting members 56 and 57 are transversely adjustable on shafts, as at 58, the shafts being carried by suitable angle supports 60.

The exit end of the machine is provided with an outlet ramp fixture 61 which also comprises spaced longitudinally adjustable angles 62 and 63, clampingly mounted in supports 64 and 65, respectively. The supports 64 and 65 are adjustably mounted for transverse positioning as desired on shafts 66 and 67, the shafts 66 and 67 being carried by generally V-shaped angle supports 68 and 70, adjustably mounted on the end plate 31, generally similar to the mounting of the angular members 60 on the end plate 40 at the inlet end of the machine 20.

A conveyor means 71 is provided, including a drive pulley 69 housed between the frame members 32 and 33, a driven pulley 72 at the opposite or inlet end of the machine 20, a continuous belt 73, and a belt tensioning pulley 74. The idler pulley 72, as well as the drive pulley 69 have shafts suitably journalled in bearing pillow blocks 75 and 79.

The flight belt 73 is molded to be of integral one-piece construction and includes an upper run 76 and a return run 77. The integral belt 73 includes equidistantly spaced projections 78, which act as pushers and which cooperate to define container-receiving pockets along an upper run 76 of the belt 73, the projections 78 being generally vertically upstanding with respect to the horizontal disposition of the belt upper run 76.

The tensioning pulley 74 includes a bearing 80 at each end thereof, rotatably receiving a shaft 81 of the pulley 74, and being slidable along track guides 82 and 83, upon selective adjustment of a manually actuable threaded adjustment member 84.

The flight belt 73 is driven longitudinally of the machine 20 by rotation of the drive pulley 69 disposed between the frame portions 32 and 33, by a motor 85, drive belts 86 and pulley 87, the pulley 87 being mounted on a common shaft 88 with the drive pulley 69. The flight belt drive motor 85 is mounted on a plate 90 transversely disposed between the sloped support members 28 and 30, as viewed in FIGURE 1, near the container exit end of the machine 20.

The flight belt 73 is thus adapted to receive containers from the inlet ramp means 53, and to deliver the containers to the outlet ramp means 61.

Container guide members, general designated by the numerals 91 and 92 are provided, each extending longitudinally on opposite sides of the flight belt 73, adjacent the upper run 76 thereof, cooperating to substantially close the ends of the pockets defined between the upper run 76 of the flight belt 73, and the upstanding projections 78 thereof, as viewed in FIGURES 5 and 15. Each of the guide members 91 and 92 is substantially identical in construction, and therefore a single one only need be described.

The guide member 91 includes a flexible belt 93 longitudinally disposed between ends of the machine 20, the ends of the belt 93 traversing circumferential surface portions of belt-adjustment rollers 94. The extreme ends 95 of the belt 93 are suitably secured, each to a threaded adjustment member 96, each adjustment member 96 including a manually actuable member 97 and a compression spring 98 for selectively placing the belt 93 under a desired spring tension relative to the machine frame, as viewed in FIGURE 6.

Each of the belt-adjustment rollers 94 is pivotally mounted on the machine frame, for example, on the upstanding support members 41 and 42, illustrated in FIGURE 6. The rollers 94 are connected to their pivotal mounts 100 by connecting arms 101, to provide an arcuate path in which the rollers 94 may be adjustably positioned.

Adjustable stop means 102, each comprising a boss 103 and a manually actuable threaded adjustment member 104 are provided, for abuttingly engaging each connecting rod 101, to provide a stop against which the outward pivotal movement of the rollers 94 may be limited. The force provided by the spring 98 is transmitted through the belt end 95, and through the belt 93 to the roller 94, thereby retaining the connecting rod 101 against the interior end of the manually actuable adjustment rod 104.

Each of the guide belts 93 include a central portion 105 and end portions 106 and 107. Each of these portions 105, 106 and 107 of the guide member 91 or 92 is provided with a back-up plate 108, to which is secured upper and lower back-up bars 110 and 112, respectively, the belts 93 being secured to each plate 108 and bar 110, 112, by means of counter-sunk screws 113 and nuts 114.

The guide member sections 105 and 106 are hingedly secured together by means of a hinge 115. Similarly, the guide member sections 105 and 107 are hingedly secured together by a hinge 116. Each of these hinges 115 and 116 is secured to a back-up plate 108 of each of the guide member sections being inter-connected. With particular rererence to FIGURE 16, it is clearly illustrated that the hinge 116 provides a hinged connection between the backup plates 108 of each of the guide member sections 105 and 107, each of the sections 105 and 107 being movable relative to the other about a hinge pin 117.

Only guide member 91 is provided with a spacer 118, secured to the lower end of its belt 93, the spacer 118 comprising a central section 120 and end sections 121 and 122, corresponding respectively to the central section 105 and the end sections 106 and 107 of the guide member 91, respectively. Each of the spacer sections 120, 121, and 122 includes a channel 123, longitudinally disposed along the belt 93, and secured thereto by fasteners 124. Each channel 123 is provided with a frictionless insert 125, of nylon construction or the like, having a longitudinally disposed central portion of generally C-shaped cross-sectional configuration, to provide two outwardly projecting spacer portions 126 and 127 with an intermediate groove 128, adapted to receive projecting portions of container ends, as containers are moved therealong. Reference is made in particular to FIGURE 15 in this regard.

A belt support plate 130 is provided, disposed horizontally immediately below the upper run 76 of the belt 71, for supporting the upper run and retaining the same in a substantially horizontal position.

With reference to FIGURE 7 in particular, a generally U-shaped frame member 131 is provided, having longitudinally disposed upstanding side portions 132 and 133, and a longitudinally disposed bottom portion 134 and inturned upper side portions 135 and 136. Vertically upstanding braces 136, 137, 138, 140, 141 and 142 are provided, welded along outer surfaces of the frame side members 132 and 133, at the middle and the ends thereof. Threaded members are provided, extending through holes (unnumbered) in the sidewalls 132 and 133 of the U-shaped framed 131, and through the attached braces 136, 137, 138, 140, 141 and 142, locked at their inner and outer ends by nuts 144 and 145. The innermost ends of the threaded members 143 are threadably engagd within associated bosses 146, welded to the plate 108, of the central section 105, of each of the guide members 91. This disposition of the six threaded members 143 facilitates the selective adjustable spacing of the guide members 91 and 92, depending upon the end-to-end length of a container being conveyed therebetween.

A spacer support 146 is provided, generally centrally of the U-shaped frame 131 extending transversely across the upper portion of the frame, between the inturned sidewall portions 135 and 136, being welded thereto to provide the desired rigidity at a central portion of the frame 131.

A pair of generally rectangular frame supports 147 and 148 are provided, disposed about the U-shaped frame 131, near each end thereof, the rectangular supports 147 and 148 being welded to the sidewalls 132 and 133 and the bottom wall 134 of the U-shaped frame 131. A pair of yokes 150 and 151 protrude, respectively, from one side of each of the rectangular-shaped support members 147 and 148. The yokes 150 and 151 each comprise a pair of plates 152 and 153 extending outwardly from the sidewall 133 of the U-shaped frame 131, the plates 152 and 153 being generally triangular in configuration and having shafts 154 and 155 clamped therein.

The shafts 154 and 155 are journalled respectively, in throw ends 156 and 157 of pitmans 158 and 160. The pitmans 158 and 160 have strap ends 161 and 162 respectively, which rotatably journal associated respective eccentrics 163 and 164.

The eccentrics 163 and 164 are keyed or otherwise secured to a longitudinally disposed shaft 165, rotatably carried in bearing pillow blocks 166, 167 and 168, at substantially the vertical elevation of the U-shaped frame 131, at one side thereof. The eccentrics 163 and 164 are provided with grease cups 170 and 171, for lubrication thereof. Counter-weights 172 and 173 are also carried by the shaft 165, positioned off-center in diammetrically opposite directions from the off-center disposition of the eccentrics 163 and 164, for balancing the shaft 165.

A pair of channels 175 and 176 are disposed transversely of the machine 20, between generally central portions of the beams 22 and 23, being welded thereto. A horizontal support member 177 is secured beneath the plate 45 and is secured in position by vertical and angularly disposed supporting studs 178 and 180 which are secured at their lower ends to the channels 175 and 176. Additional vertical studs 181 and 182 are secured at their lower ends, respectively to the plate 45 and the horizontally disposed support member 177, and carry a generally horizontal channel portion 183 at their upper ends.

The horizontal channel portions 48, 183, and 52 respectively provide supports for the pillow blocks 168, 167, and 166, with the pillow blocks being spaced from their respective supporting channels by spacer blocks 184.

A pair of pillow blocks 185 and 186 are mounted on the channels 175 and 176 and carry a shaft 187 therein. A pair of belt pulleys 188 and 190 are mounted at opposite ends of the shaft 187 and are connected by means of belts 191 and 192 to respective belt pulleys 193 and 194 which are keyed to the shaft 165. Belt tensioning pulleys 195 and 196 are provided for the respective belts 191 and 192, in order to maintain the desired belt tension and prevent slippage between the belts and pulleys. A belt pulley 197 is also carried by the shaft 187, and is keyed or otherwise secured thereto.

Pillow blocks 198 and 200 are mounted on supporting blocks 201 which are carried on the channels 175 and 176 and supported thereby. A shaft 202 is carried in the pillow blocks 198 and 200, which has pulleys 203 and 204, mounted thereon, and a manually actuable handle 205 secured to one end. The handle 205 is adapted to facilitate the manual driving of the eccentrics 163 and 164, for facilitating the initial positioning of the eccentrics, as desired. Belts 206 connect the pulleys 203 and 197 for driving the shaft 187 at a reduced speed, the pulley 204 being driven by a belt 207 which is driven from a combination motor and transmission 208 which is mounted between the channels 175 and 176.

Thus, the eccentrics 163 and 164 are driven by the shaft 165, which in turn is driven through the pulleys 194, the belts 191 and 192, the pulleys 188 and 190 on the shaft 187, the pulley 197 and its drive belts 206, the pulley 203 carried by the shaft 202, the pulley 204 which drives the shaft 202, the drive belt 207, and the combination motor and transmission 208.

Guide means 210 and 211 of the roller-and-track type are provided at each end of the frame 131, for constraining the movement of the frame to be linear and transverse to the path of movement of the upper run 76 of the belt 73, in a controlled back-and-forth motion. The roller-and-track guide means 210 and 211 are substantially identical, and therefore only the guide means 210 need be discussed in detail.

With particular reference to FIGURE 7 and 8, the guide means 210 includes a pair of bosses 212 welded beneath the generally rectangular member 147 disposed about the U-shaped frame 131. The bosses 212 are spaced transversely of the rectangular member 147, and each includes a shaft 213, secured therein, on which a roller 214 is rotatably received. The rollers 214 engage against track surfaces 215 of track members 216 which are secured to an interior flange 217 of the channel 52 by means of bolts 218. The guide means 210 and 211 are generally mirror images of each other, and therefore the rollers 214 and tracks 215 in each of the guide means cooperate to constrain the frame 131 against longitudinal movement, as is readily seen, with reference to FIGURE 5.

A pair of L-shaped ears 220 are welded to outer sides 132 and 133 of the U-shaped frame member 131, and each carries a spring guide pin 221, a threaded end of which is clamped to the ear 220 by means of a nut 222. A compression spring 223 is disposed about each pin 221 and the lower end of each spring 223 is received within a boss 224 which carries depending plates 225 and 226, between which are carried shafts 227. A roller 228 is rotatably mounted on each shaft 227 and movable along an associated track surface 230 of a track plate secured to the channel 52.

The plates 225 and 226 extend entirely beneath the U-shaped frame member 131 and are pivotally secured by a pin connection 231 to a depending plate 232 which is secured or otherwise welded beneath the bottom wall 132 of the U-shaped frame 131.

The plates 225 and 226 carry shaft-mounted rollers 233 and 234 which engage against track surfaces 235 and 236 of respective upper track members 237 and 238. The track members 237 and 238 are disposed on track supports 240 and 241, respectively, which are welded to the horizontal channel 52, and are retained against the track supports 240 and 241 by threaded guide members 242 which are engaged within the track supports 240 and 241, and which extend through clearance holes in the track members 237 and 238. Compression springs 243 engage against heads of the guide members 242 and also engage within seating bores 244 of the track members 237 and 238. The compression springs 243 cooperate to permit a slight upward movement of a localized track portion 237 or 238 when a predetermined compression spring force is overcome, in order to retard machine vibrations caused by shock and the like and to provide a safety feature which prevents breakage of machine parts by permitting a limited upward movement of the tracks 237 and 238 when predetermined compression spring forces are overcome.

The pin connection 231 between the plate 232 carried by the frame member 131 and the plates 225 and 226 also, in combination with the compression springs 223 cooperate to provide an additional safety feature, whereby if an excessive driving force overcomes a predetermined compression force in the springs 223, one of the rollers 228 would be permitted a slight vertical movement off its track 229, pivoting about the pin 231.

Thus, the rollers 233 and 234, in engagement against the track surfaces 235 and 236, and the rollers 228 in engagement against the tracks 229 constrain the U-shaped frame 131 for movement in a horizontal plane only, unless shock forces are realized during transverse movement of the frame 131, in which case the springs 223 and 243 will permit slight vertical components of motion for the frame 131, thereby precluding excessive force loads on the various components which could tend to result in breakage of the components.

Operation

With particular reference to FIGURE 3, the operation of the machine 20 of this invention is best illustrated.

Containers (not shown) are conveyed from the inlet conveying means 53 onto the upper run 76 of the belt 73 into pockets formed between adjacent ones of the upstanding belt projections 78.

As containers are moved toward the exit end of the machine, or leftward as viewed in FIGURE 3, they are shaken transversely of their path of travel through the machine, by a backward and forward oscillation of the U-shaped frame member 131 being driven by the pitmans 158 and 160, the pitmans being driven by their respective eccentrics 163 and 164, to provide a desired transverse stroke for the central section 105 of each of the guide members 91 and 92. During this transverse movement of the central sections 105 of the guide members 91 and 92, the frame member 131 is normally constrained for transverse back-and-forth linear movement only. Also, this rapid back-and-forth motion of the central section 105 of each of the guide members 91 and 92 causes the central section 105 to be pivoted relative to the end sections 106 and 107, about the hinges 115 and 116. The belts 93 of the guide members 91 and 92 are urged into straight line positions between their pulleys 94 by the springs 98 associated with the threaded adjustment rods 96 attached to the belt ends 95. It is to be understood that the stroke may be pre-set as desired, as well as the frequency, to achieve a desired shaking of a container and its included fill. The containers are then delivered to the outlet ramp means 61 at the left end of the machine 20, as viewed in FIGURE 3.

With reference to FIGURE 4, there is illustrated the behavior of a fill, for example, of a liquid medium inside a container C disposed between guide members 91 and 92. The guide members 91 and 92 are spaced beyond the ends of the container C to permit the container C to be moved longitudinally therebetween, and the guide members 91 and 92 are reciprocated in the direction of the double-headed arrow illustrated in FIGURE 4, to engage opposite ends of the can C and to slide the can along the upper runs 76 of the belt 73. The arrows inside the can C illustrate paths of flow of the medium inside the can C during the linear reciprocation of the frame 131, and consequently of the can C. It is readily seen that the fill within the can C will be shaken laterally, and will be free of eddy currents and the like which may be present when the motion of a shaken can C includes an arcuate component.

Referring now to FIGURE 17, there is illustrated a container C' disposed for oscillation across an upper belt run 76', between guide members 91' and 92'. The motion of the frame (not shown) which provides the motion for the guide members 91 and 92 is in the generally oscillatory direction of the double-headed arrow illustrated in FIGURE 17, such that the guide members 91' and 92' have an arcuate component of motion, some of which may be transferred to the container C' as the container is engaged at its ends by the guide members 91' and 92', possibly resulting in undesirable eddy currents of the fill within the can C'. Such eddy currents can be undesirable, in that portions of the fill can possibly avoid becoming mixed homogeneously throughout the can C' but can remain, for example, in corners thereof, as illustrated schematically by the arrows inside the can C' of FIGURE 17.

It is thus readily seen that, by providing a linear back-and-forth shake for a can C', a fill, such as one of liquid medium will be evenly shaken and therefore homogenized to a desired degree, providing a more thorough mixing of the fill within the can C'. In addition to improving the mix of a fill within a container C, the linear shake of this invention has been found to result in longer life and decreased wear charactertistics of the various machinery components, in virtually eliminating wear resultant from a vertical component of motion of the guide members 91 and 92.

An embodiment of the machine 20 illustrated has been designed to have approximately a four inch stroke of the guide members 91 and 92, in a direction transverse to the machine. However, it is to be noted that upon selection of eccentrics 163 and 164, of a desired size, various other lengths of stroke may be obtained. Moreover, it is apparent that adjustable eccentrics may also be utilized, in those situations in which a machine 20 requires frequent or rapid changes in stroke length.

It is further to be noted that the machine 20 of this invention may be utilized for shaking various types of cans and other containers, as desired. While cans in particular have been referred to in this description, it is to be understood that all other types of containers and other items as well may be shaken on the machine of this invention without departing from the spirit and scope thereof.

The modification of the guide member 91 illustrated in FIGURE 15, in which the spacer member 118 is secured thereto has been illustrated and discussed above, with reference to FIGURE 15. It is to be noted, that as a can C'', for example, of the aerosol type is shaken across the upper run 76 of the belt 73, the right-most end of the can C'' is adapted to be engaged by belt 93 of the guide 92, and the left-most end of the can is adapted to be engaged by the projections 126 and 127 of the spacer member 118, with the can projection P safely housed within the groove 128 of the insert 125.

Lubrication

A common lubrication system 246 is provided for the machine 20 of this invention, as illustrated in FIGURE 12. An oil reservoir 247 is provided, which is manually actuable by a lever 248, to provide oil under pressure through the pressure lines 250 and 251 to the various bearing members which require lubrication, as for example, through the distribution lines 252, 253, 254, 255 and 256, to the bearings 80, 75, the bearing portions of the hinges 115 and 116, and the bearing 79, respectively. Other lubrication distribution lines 257 are provided, to various other bearing elements of this invention, which require lubrication, all of the distribution lines 252 through 257 being connected to the line 251 by suitable injectors 258. Thus, the machine 20 of this invention may be readily and efficiently lubricated, as desired.

In FIGURE 13, there is illustrated an alternative form 260 of a shaking machine of this invention, constructed generally along the lines of the machine 20, but being adapted to provide a substantially longer shake time, by using substantially elongated container conveying means 261, substantially elongated container guide means 262, a substantially elongated U-shaped frame 263, and four driving eccentrics 264, 265, 266 and 267. The machine 260 is otherwise provided with eccentric drive means 268, conveyor drive means 270 and roller-and-track frame guide means (not shown), similar to the machine 20. The machine 260 utilizes a plurality of upstanding supports 271 through 274, mounted on generally horizontally disposed channels 275 which extend across longitudinally disposed supporting beams 276.

The conveying means 261 of the machine 260 comprises a belt 278 having projections 277 welded integral therewith, or may comprise a separate belt having projections 277 secured thereto, as desired. The machine 260 is adapted to provide approximately twice as great a shaking time as the machine 20.

It is to be noted that various covers and screens are utilized on the machines 20 and 260 of this invention, such as the screen 179, illustrated in phantom in FIGURE 1, for covering the eccentrics and counter-weights of the machine 20. Other covers may also be used for the various drive components, such as pulleys and belts, for the purpose of safety of machine operators, as well as to protect the various machine components.

Various control means may be utilized with the machines 20 and 260, but conventional electrical switch boxes E and E', such as those illustrated in FIGURE 1 have been found desirable to control the operation of the conveyor motor and the eccentric drive motor.

From the foregoing, it will be seen that novel and advantageous provisions have been made for carrying out the desired end. However, attention is again directed to the fact that additional variations may be made in this invention without departing from the spirit and scope thereof as defined in the appended claims.

We claim:

1. A machine for handling articles conveyed along a path, comprising means for conveying articles along a predetermined path and means for shaking articles in a back-and-forth straight line motion simultaneously with the conveying of articles along said path, said shaking means including article engageable guide means disposed alongside said path for directly engaging articles and directly imparting said back-and-forth straight line motion thereto, and means for linearly oscillating said guide means.

2. The machine of claim 1 wherein said latter means comprises a drive shaft and an eccentric mounted thereon, a frame carrying said guide means, and a connection member between said frame and said eccentric.

3. The machine of claim 2 wherein guide means are provided for said frame, comprising rollers and associated tracks.

4. A can shaking machine for use in mixing products disposed within containers, comprising means for conveying containers along a predetermined generally horizontal path, and means for shaking containers in a back-and-forth straight line motion simultaneously with the conveying of containers along said path, said straight line motion being horizontal and transverse to the horizontal path, said container shaking means including container engaging guide members separate from said conveying means and being disposed longitudinally on opposite sides of said path for engaging opposite container portions passed therebetween, said shaking means also including means for oscillating at least portions of said guide members in back-and-forth straight line motion.

5. The machine of claim 4 wherein roller guide means are provided for constraining said guide members in their straight line motion.

6. The machine of claim 5 wherein said roller guide means includes a plurality of rollers and cooperating linear tracks.

7. The machine of claim 6, wherein at least one roller and track is operative to define a straight line path portion against unwanted vertically upward motion, at least one other roller and track being operative to define a straight line path portion against unwanted vertically downward motion, and at least one other roller and track being operative to define a straight line path portion against unwanted longitudinal motion.

8. The machine of claim 6 wherein means are provided associated with at least one roller and cooperating track for permitting limited roller movement in a direction transverse to the normal direction of movement of a roller along its track when forces tending to urge a roller off its track exceed a predetermined level.

9. The machine of claim 8 wherein said latter means include spring means and associated guide elements being carried by one of a roller and its track for retaining rollers in engagement with their associated tracks until said forces overcome the predetermined force level set in the spring means.

10. The machine of claim 9 wherein said latter means include pin means for permitting said guide members to move pivotally about a longitudinally disposed axis in said limited movement.

11. The machine of claim 4 wherein said oscillating means includes an eccentric drive means for driving said guide members, said eccentric drive means including a rotatable shaft disposed at the general vertical elevation of said guide members, at least one eccentric mounted on said shaft, and a pitman acting as a connection member between said eccentric and at least one of said guide members.

12. The machine of claim 11 wherein a frame is provided, which carries said guide members, said pitman being connected to said frame.

13. The machine of claim 12 wherein each eccentric is provided with a counter-weight carried by said rotatable shaft, said shaft being belt driven from a motor, through a speed reducer.

14. The machine of claim 4 wherein said conveying means includes an endless member having spaced upstanding portions defining container receiving pockets therebetween, and said endless member and upstanding portions comprise a belt of integral one-piece construction.

15. The machine of claim 4 wherein said oscillating means includes an eccentric drive means connected for driving said guide members, said guide members are adjustably connected to a frame with said frame being connected to said eccentric drive means, and roller and track guide means are provided for said frame for limiting the guide members to the straight line motion.

16. The machine of claim 4 wherein central portions of said guide members are movable transversely of said path about hinge connections with end portions of said guide members.

17. The machine of claim 4 wherein said conveying means includes an endless member having spaced upstanding portions defining container-receiving pockets therebetween, and said guide members being disposed for transverse oscillation relative to an upper run of said endless member.

18. A container shaking machine for use in mixing products disposed within containers, comprising means for conveying containers along a predetermined generally horizontal path, and means for shaking containers in a back-and-forth straight line motion simultaneously with the conveying of containers along said path, said means for shaking containers including container engaging guide member separate from said conveying means and being disposed longitudinally on opposite sides of said path for engaging opposite container portions passed therebetween, one of said guide members including a spacer mounted thereon, said spacer having a longitudinal groove therein for receiving projecting portions of containers conveyed along the path.

19. The machine of claim 18 wherein said spacer includes a generally C-shaped portion and is of nylon construction.

20. A machine for shaking containers having a fill therein to render the fill homogeneous and to evenly shake the fill throughout the containers, comprising an endless conveyor belt having a generally horizontally disposed upper run, with upstanding projections on said belt run for defining a plurality of container-receiving pockets therein, means for driving said belt at a desired speed, continuous flexible container guide means adjustably disposed on opposite sides of said belt at predetermined distances depending upon the length of containers disposed between said guide means for directly engaging opposite ends of containers carried by said belt, means for driving said guide means in a straight line back-and-forth horizontal motion transversely of said belt, said latter means including a frame member carrying said guides, a drive shaft, an eccentric mounted on the drive shaft, a pitman connecting said frame member and said eccentric, motor and speed control means for said shaft, and frame guide means comprising a plurality of rollers and associated roller tracks.

References Cited

UNITED STATES PATENTS

| | | | |
|---|---|---|---|
| 2,542,451 | 2/1951 | Anderson | 259—54 |
| 3,332,668 | 7/1967 | Walker | 259—59 |

ROBERT W. JENKINS, *Primary Examiner.*